United States Patent
Bae et al.

(10) Patent No.: US 11,851,238 B2
(45) Date of Patent: Dec. 26, 2023

(54) PALLET FOR TRANSPORTING PARTS

(71) Applicants: Hyundai Motor Company, Seoul (KR); Kia Corporation, Seoul (KR)

(72) Inventors: Junhyeok Bae, Ulsan (KR); Jeong Seong An, Ulsan (KR); Young Seok Lee, Ulsan (KR); Chul Hyun Jang, Ulsan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 86 days.

(21) Appl. No.: 17/524,151

(22) Filed: Nov. 11, 2021

(65) Prior Publication Data

US 2022/0250792 A1    Aug. 11, 2022

(30) Foreign Application Priority Data

Feb. 10, 2021    (KR) .......................... 10-2021-0019007

(51) Int. Cl.
  *B65D 19/00*    (2006.01)
(52) U.S. Cl.
  CPC .................... *B65D 19/0018* (2013.01); *B65D 2519/00288* (2013.01); *B65D 2519/00696* (2013.01); *B65D 2519/00796* (2013.01)
(58) Field of Classification Search
  CPC ............................ B65D 19/0018; B65D 19/44
  USPC ...................................... 108/55.1, 55.3, 55.5
  See application file for complete search history.

(56) References Cited

U.S. PATENT DOCUMENTS

| 1,050,352 | A | * | 1/1913 | Deutschman | ........... | B60B 33/06 16/33 |
| 4,015,710 | A | * | 4/1977 | Biggs | ..................... | B65D 19/44 248/346.02 |
| 4,344,368 | A | * | 8/1982 | Remington | ............ | B65D 19/44 108/55.3 |
| 4,393,999 | A | * | 7/1983 | Forshee | ................. | B65D 19/44 248/346.02 |
| 4,693,370 | A | * | 9/1987 | Aceti | ..................... | B65D 19/44 29/799 |
| 4,915,033 | A | * | 4/1990 | Bond | ..................... | B65D 19/44 108/55.1 |
| 4,921,101 | A | * | 5/1990 | Gatt | ....................... | B65D 85/48 206/451 |

(Continued)

FOREIGN PATENT DOCUMENTS

| FR | 2979889 A1 | 3/2013 |
| JP | H05-277848 A | 10/1993 |
| JP | 2001-150251 A | 6/2001 |

OTHER PUBLICATIONS

EP Search Report dated Apr. 20, 2022.

*Primary Examiner* — Jose V Chen
(74) *Attorney, Agent, or Firm* — MORGAN, LEWIS & BOCKIUS LLP

(57) ABSTRACT

A part transporting pallet transports a part to a predetermined destination by a mobile carriage that includes a lifter which is configured for moving upwards and downwards in a vertical direction, and includes: a pallet body that forms at least one coupling hole which may be coupled with the lifter; and plurality of part aligning units have at least two position aligning pins that correctly position parts of different types on the pallet body, and are provided on the pallet body to vary the position of the position aligning pins according to the types of the parts.

21 Claims, 12 Drawing Sheets

(56) References Cited

U.S. PATENT DOCUMENTS

| | | | | |
|---|---|---|---|---|
| 4,977,836 A * | 12/1990 | Bond | ................... | B65D 19/44 248/346.02 |
| 5,080,023 A * | 1/1992 | Miura | ................... | B65D 19/44 108/55.3 |
| 5,190,273 A * | 3/1993 | Salvagnini | ............. | B25B 5/061 269/21 |
| 5,193,700 A * | 3/1993 | Lyman | ................... | B65D 19/44 206/386 |
| 5,297,485 A * | 3/1994 | Bond | ................... | B65D 19/44 108/54.1 |
| 5,497,708 A * | 3/1996 | Jeruzal | .................. | B65D 19/44 108/55.3 |
| 5,644,991 A * | 7/1997 | Prevot | ................... | B65D 19/44 108/55.3 |
| 5,970,885 A * | 10/1999 | Polando | ................ | B65D 19/44 108/55.3 |
| 7,980,389 B1 * | 7/2011 | Lee | ........................ | B65D 19/44 206/821 |
| 8,028,631 B2 * | 10/2011 | Lauzier | .............. | B65D 19/0002 108/55.3 |
| 8,418,632 B2 * | 4/2013 | Linares | .............. | B65D 19/0018 108/57.25 |
| 11,619,340 B2 * | 4/2023 | Aliwi | ................... | F16B 5/0283 248/688 |
| 2004/0016373 A1 * | 1/2004 | Bodde | ................... | B65D 19/44 108/55.5 |
| 2005/0150194 A1 * | 7/2005 | Okamuro | ............... | B65D 19/44 53/494 |
| 2009/0235846 A1 * | 9/2009 | Gao | ........................ | B65D 19/44 108/55.3 |
| 2011/0061572 A1 * | 3/2011 | Liu | ....................... | B65D 19/001 108/55.5 |
| 2014/0130720 A1 * | 5/2014 | Nelson | ................... | B65D 19/44 108/51.3 |
| 2015/0151873 A1 * | 6/2015 | Luis y Prado | ..... | B65D 19/0012 108/55.5 |
| 2017/0027411 A1 * | 2/2017 | Gobl | ....................... | B08B 13/00 |
| 2017/0129283 A1 * | 5/2017 | Trickle | ..................... | B62B 1/12 |
| 2018/0265249 A1 | 9/2018 | Grutt | | |
| 2018/0273243 A1 | 9/2018 | Kilibarda et al. | | |
| 2018/0290841 A1 | 10/2018 | Ciftci et al. | | |
| 2019/0276187 A1 * | 9/2019 | Tamura | ................... | B65D 25/10 |
| 2021/0341094 A1 * | 11/2021 | Jacobs, II | .............. | B65D 85/68 |
| 2021/0380311 A1 * | 12/2021 | Schwarz | ............ | B65D 19/0002 |

* cited by examiner

PALLET FOR TRANSPORTING PARTS

CROSS-REFERENCE TO RELATED APPLICATION

The present application claims priority to Korean Patent Application No. 10-2021-0019007 filed on Feb. 10, 2021, the entire contents of which is incorporated herein for all purposes by this reference.

BACKGROUND OF THE INVENTION

Field of the Invention

The present invention relates to a part transporting pallet. More particularly, the present invention relates to a part transporting pallet for transporting a part to a predetermined location.

Description of Related Art

In generation, pallets are used to transport goods or parts in factories or industrial sites. For example, in a process of assembling various assembly parts or assembling the assembly parts to a vehicle body in a vehicle production process, the assembly parts are transported to a predetermined place through pallets.

Recently, to implement a smart factory in a vehicle production factory, research on automation of production lines is being actively conducted, and interest in the application of unmanned transfer of pallets is increasing.

Therefore, an autonomous mobile robot (hereinafter referred to as an AMR) as a mobile carriage for unmanned transportation of flexible and efficient pallets is operated in the production line of the vehicle production factory.

On the other hand, conventionally, an unmanned logistics system that combines a pallet provided with a mechanism for aligning or correctly positioning parts to the AMR is applied. In such an unmanned logistics system, the AMR drives autonomously along a predetermined path for each process, and can transport parts placed on pallets in an unmanned manner to predetermined places.

However, in the related art, as a dedicated mechanism for aligning or correctly positioning a single type of part is formed on a pallet, new production of a pallet corresponding to each type of component is required.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a part transporting pallet that aligns or correctly positions a plurality of types of portions in common, and allows it to be transported to a predetermined destination by a moving carriage such as AMR and the like.

A part transporting according to various exemplary embodiments of the present invention transports a part to a predetermined destination by a mobile carriage that includes a lifter which is configured for moving upwards and downwards in a vertical direction according to various exemplary embodiments of the present invention, and includes: i) a pallet body that forms at least one coupling hole which may be coupled with the lifter; and ii) plurality of part aligning units have at least two position aligning pins that correctly position parts of different types on the pallet body, and are provided on the pallet body to vary the position of the position aligning pins according to the types of the parts.

In the part transporting pallet according to the exemplary embodiment of the present invention, a lift pin provided in the lifter may be coupled to the coupling hole.

Furthermore, the part transporting pallet according to the exemplary embodiment of the present invention may further include a plurality of part support pads provided in the pallet body.

Furthermore, in the part transporting pallet according to the exemplary embodiment of the present invention, the pallet body may include: a base plate that supports the part; a plurality of legs that are provided in the base plate; and a positioning pin which is provided at a lower end portion of each leg.

Furthermore, in the part transporting pallet according to the exemplary embodiment of the present invention, the positioning pin may be coupled to a positioner provided at the predetermined destination in a vertical direction thereof.

Furthermore, in the part transporting pallet according to the exemplary embodiment of the present invention, the positioning pin may form a taper portion at a lower end portion.

Furthermore, in the part transporting pallet according to the exemplary embodiment of the present invention, the taper portion may be coupled to a pin coupling groove provided in the positioner.

Furthermore, in the part transporting pallet according to the exemplary embodiment of the present invention, the taper portion may be guided to the pin coupling groove by a pin guide groove which is formed in the shape of the taper provided in the positioner.

Furthermore, in the part transporting pallet according to the exemplary embodiment of the present invention, the legs may be provided to be configured for being docking-coupled to a docking groove formed in the positioner.

Furthermore, in the part transporting pallet according to the exemplary embodiment of the present invention, the part aligning unit may include: a holder coupled to the pallet body; a locator that includes branching portions branched in a plurality of directions, and is rotatably coupled to the holder; and a position determining pin which is fixed to the locator and coupled to the holder.

Furthermore, in the part transporting pallet according to the exemplary embodiment of the present invention, the part aligning unit may further include a knob which is provided at a connection point of the branching portions in the locator.

Furthermore, in the part transporting pallet according to the exemplary embodiment of the present invention, the position aligning pin may be provided in remaining branching portions excluding for a branching portion to which the position determining pin is coupled, among the branching portions.

Furthermore, in the part transporting pallet according to the exemplary embodiment of the present invention, position determining grooves respectively corresponding to the branching portions may be formed in the holder.

Furthermore, in the part transporting pallet according to the exemplary embodiment of the present invention, the position determining pin is configured to be fitted into one of the position determining grooves.

Furthermore, in the part transporting pallet according to the exemplary embodiment of the present invention, the part aligning unit may further include a support rod which is integrally provided in the locator.

Furthermore, in the part transporting pallet according to the exemplary embodiment of the present invention, the support rod may be coupled to a support groove formed in the holder.

Furthermore, in the part transporting pallet according to the exemplary embodiment of the present invention, the pallet body may include a main mount hole for mounting the part aligning unit, and may include a spare mount hole at a location close to the main mount hole.

Furthermore, in the part transporting pallet according to the exemplary embodiment of the present invention, the pallet body may further include a caster which is pivotally connected to a lower end portion of each leg.

Embodiments of the present invention can secure flexible productivity of multi-type parts, and reduce equipment investment costs.

Furthermore, the effects which may be obtained or predicted by various exemplary embodiments of the present invention will be included directly or implicitly in the detailed description of various exemplary embodiments of the present invention. That is, various effects predicted according to various exemplary embodiments of the present invention will be included within a detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
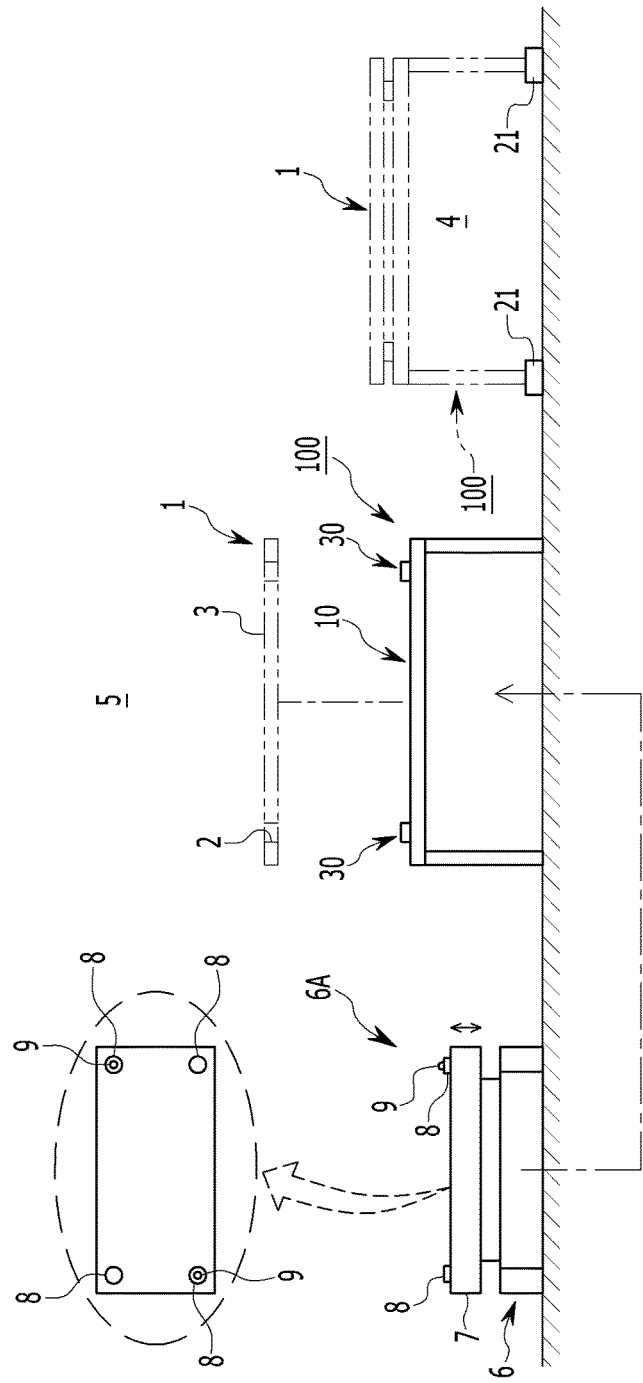
FIG. 1 schematically illustrates a part transporting system to which a part transporting pallet according to various exemplary embodiments of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which embodiments of the present invention are shown. As those skilled in the art would realize, the described embodiments may be modified in various different ways, all without departing from the spirit or scope of the present invention.

the drawings and description are to be regarded as illustrative in nature and not restrictive, and like reference numerals designate like elements throughout the specification.

Since the size and thickness of each component shown in the drawings are arbitrarily indicated for convenience of explanation, the present invention is not necessarily limited to the drawings, and the thickness is enlarged to clearly express various parts and areas.

Furthermore, in the following detailed description, the names of the components include first, second, and the like, to classify the components in the same relationship, and the order is not necessarily limited in the following description.

Throughout the specification, when it is described that a certain part includes a certain constituent element, this means that other constituent elements may be further included, rather than excluding other constituent elements, unless otherwise specifically stated.

FIG. 1 schematically illustrates a part transporting system to which a part transporting pallet according to various exemplary embodiments of the present invention is applied.

Referring to FIG. 1, a part transporting pallet 100 according to various exemplary embodiments of the present invention may be applied to assemble various assembly components 1 (hereinafter, referred to as parts for convenience) in a vehicle manufacturing factory, and/or to mount the part 1 to a vehicle body (not shown in the drawing).

Furthermore, the part transporting pallet 100 according to the exemplary embodiment of the present invention may be applied to a process of assembling an electric vehicle battery 3 as the part 1.

Furthermore, the part transporting pallet 100 according to the exemplary embodiment of the present invention may be applied to a part transporting system 5 for transporting the electric vehicle battery 3 to a destination 4 as a predetermined assembly process.

Here, an electric vehicle battery assembly process conducted at the destination 4 may be a process for fixing battery cells mounted in a battery case and coating a sealer to the battery cells for sealing.

However, the scope of the present invention should not be construed as limited to transferring the electric vehicle battery 3 to the predetermined destination 4 as described above, and the technical idea of the present invention may be applied if various parts are transported to an assembly process of a predetermined destination.

Meanwhile, the part transporting system 5 may include a mobile carriage 6A including an autonomous mobile robot (hereinafter referred to as an AMR) 6 of technology known in the art, and the part transporting pallet 100 according to the exemplary embodiment of the present invention is configured for being picked up by the mobile carriage 6A.

The AMR 6 is a carriage configured for autonomous driving along a predetermined path in a process work field, and includes a lifter 7 which may be moved up and down in the vertical direction thereof. The lifter 7 is provided in a form of a square block, and a plurality of lift pads 8 are provided on the upper surface corner of the lifter 7.

Furthermore, lift pins 9 are provided along a vertical direction in a pair of lift pads 8 disposed in one diagonal direction among the lift pads 8. Here, an upper end portion of the lift pin 9 may be formed in a taper shape.

Alternatively, the mobile carriage 6A as described above is not limited to including the AMR 6, but may include a known art automated guide vehicle (AGV) or manual carriage.

Hereinafter, the following constituent elements will be described based on the vertical direction, and a portion facing upward will be named an upper end portion, an upper portion, an upper end portion, and an upper surface, and a portion facing downward will be named as a lower end portion, a lower portion, a lower end portion, and a lower surface.

Furthermore, an end portion (one end portion or the other end portion) in the following may be defined as either end portion, and may be defined as a certain portion (one end portion or the other end portion) including the end portion.

The part transporting pallet 100 according to the exemplary embodiment of the present invention can align or correctly position a part to a predetermined position, move along a predetermined path by the AMR 6, and transport the part 1 to the destination 4.

The part transporting pallet 100 according to such various exemplary embodiments of the present invention aligns or correctly positions the part 1 of a plurality of types in common, and may be transported to a predetermined destination 4 by the AMR 6.

Figure 2:
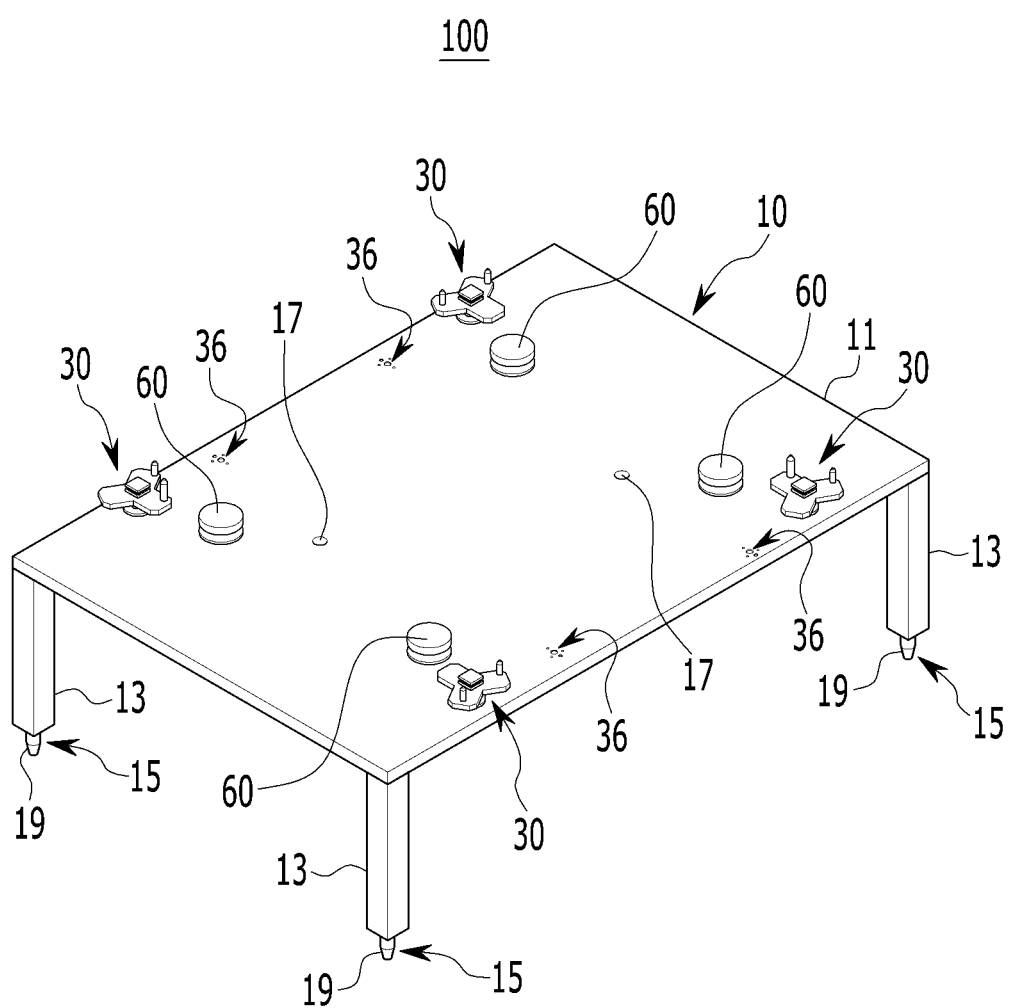
FIG. 2 is a combined perspective view exemplarily illustrating the part transporting pallet according to the exemplary embodiment of the present invention.
Figure 3:
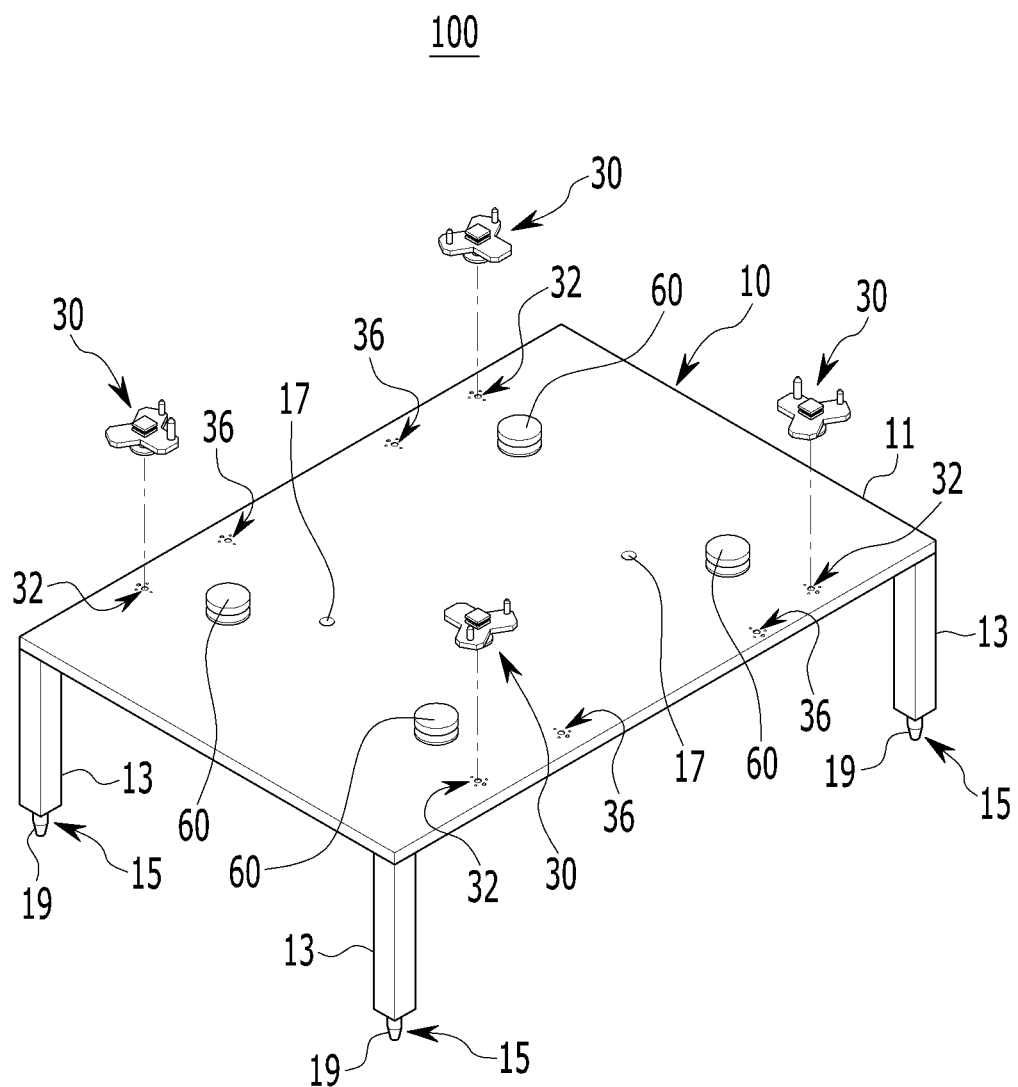
FIG. 3 is a partial exploded perspective view of the part transporting pallet according to the exemplary embodiment of the present invention.

FIG. 2 is a combined perspective view exemplarily illustrating the part transporting pallet according to various exemplary embodiments of the present invention, and FIG. 3 is a partial exploded perspective view of the part transporting pallet according to the exemplary embodiment of the present invention Referring to FIG. 1 to FIG. 3, the part transporting pallet 100 according to the exemplary embodiment of the present invention includes a pallet body 10, a plurality of part aligning units 30, and a plurality of part support pads 60.

In the above, the pallet body 10 is to mount various constituent elements to be described later, and may be formed of one frame or two or more frames connected to each other.

Furthermore, the pallet body 10 may include various accessory elements such as brackets, bars, rods, plates, blocks, ribs, and the like for supporting various constituent elements.

However, since the accessory elements are for installing each constituent element to be described further below on the pallet body 10, in the exemplary embodiment of the present invention, the above-stated accessory elements are referred to as the pallet body 10, except in exceptional cases.

The pallet body 10 according to various exemplary embodiments of the present invention includes a base plate 11, a plurality of legs 13, and a plurality of positioning pins 15.

The base plate 11 is formed in the shape of an approximately square plate. The base plate 11 includes an upper side supporting the part 1 and a lower side supporting the lifter 7.

Furthermore, at least one coupling hole 17 configured for being coupled to the lifter 7 of the AMR 6 is formed in the base plate 11. The coupling hole 17 may be formed in a pair along the diagonal direction inside the edge portion of the base plate 11.

Figure 4:
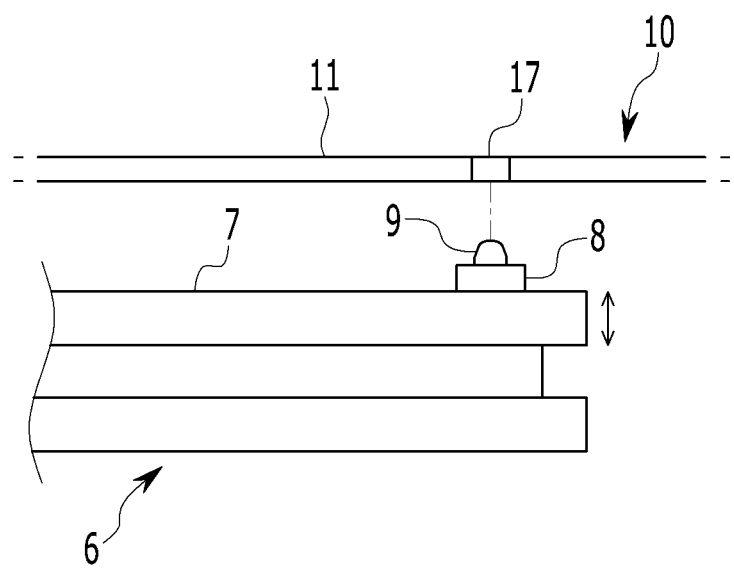
FIG. 4 shows a coupling structure of a pallet body and a lifter applied to the part transporting pallet according to the exemplary embodiment of the present invention.

Here, as shown in FIG. 4, the coupling holes 17 are engaged with the lift pins 9 of the lifter 7. Furthermore, the lift pads 8 of the lifter 7 support the lower surface of the base plate 11.

The lifter 7 may support the lower surface of the base plate 11 through the lift pads 8 while moving in the upward direction thereof.

Furthermore, the lifter 7 is moved in the upward direction, and the pallet body 10 may be moved in the upward direction while being coupled to the coupling hole 17 through the lift pins 9. Furthermore, the lifter 7 can move the pallet body 10 in the lower direction while moving in the lower direction thereof.

The legs 13 are connected to corners of the lower surface of the base plate 11 in the vertical direction thereof. The positioning pins 15 are fixed to lower end portions of legs 13.

Figure 5:
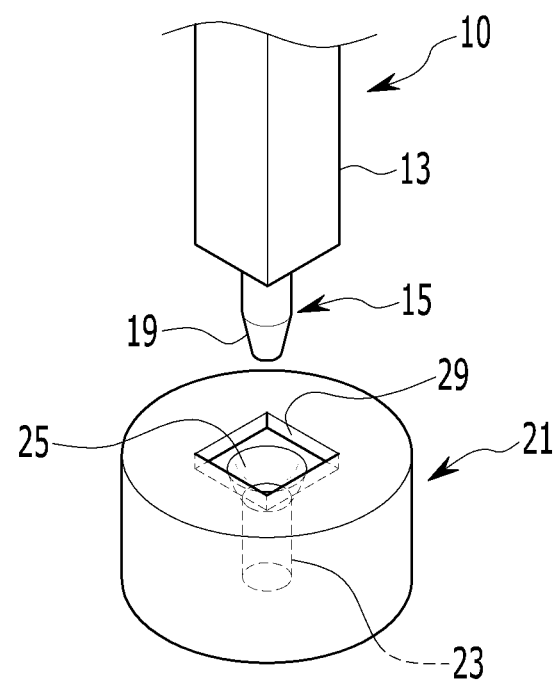
FIG. 5 shows a coupling structure of a positioning pin and positioner of the pallet body applied to the part transporting pallet according to the exemplary embodiment of the present invention.

As shown in FIG. 5, the positioning pin 15 is vertically coupled to the positioner 21 provided at the destination 4 as mentioned above. A taper portion 19 coupled to the positioner 21 is formed in the positioning pin 15 (e.g., the end portion of the positioning pin). The positioner 21 is to correctly position the pallet body 10 at a predetermined position at the destination 4.

The taper portion 19 is formed in the shape of a taper of which a cross-section diameter gradually decreases from the upper side to the lower side at the lower end portion of the positioning pin 15.

Meanwhile, the pallet body 10 is transported to the destination 4 through the AMR 6 while being lifted in the upward direction by the lifter 7 of the AMR 6. Furthermore, the pallet body 10 is lowered by the lifter 7 from the destination 4 in the downward direction thereof.

When the pallet body 10 is lowered as described above, the positioning pin 15 is coupled to the positioner 21 at the destination 4 through the taper portion 19, and the pallet body 10 may be correctly positioned at a predetermined position of the destination 4.

Here, the taper portion 19 is inserted into and coupled to a pin coupling groove 23 provided in the positioner 21. In the instant case, the taper portion 19 may be coupled to the pin coupling groove 23 while being guided to the pin coupling groove 23 by a taper-shaped pin guide groove 25 provided in the positioner 21. The pin guide groove 25 is formed in the shape of a taper of which the cross-section diameter gradually decreases from the upper side to the lower side, and is connected to the pin coupling groove 23.

Meanwhile, a docking groove 29 which may be docking-coupled with the lower end portion of the leg 13 is formed on the upper surface of the positioner 21. For example, the docking groove 29 is formed in a rectangular shape corresponding to the cross-section shape of the leg 13, and is connected to the pin guide groove 25.

Referring to FIG. 1 to FIG. 3, the part aligning units 30 according to the exemplary embodiment of the present invention align or correctly position the part 1 of different types at a predetermined position of the pallet body 10.

The part aligning units 30 may be provided on the upper corners of the base plate 11 in the pallet body 10, respectively. For example, a pair of part aligning units 30 and another pair of part aligning units 30 may be disposed in the diagonal direction thereof. The part aligning units 30 may have a variable position in the pallet body 10 depending on a type of the part 1.

Figure 6:
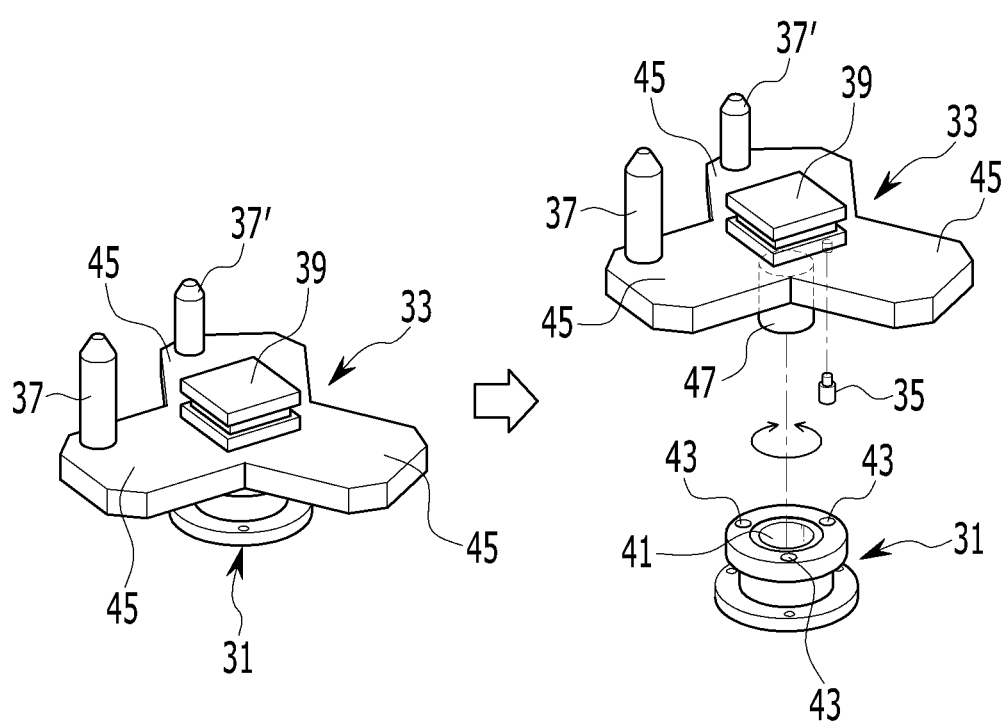
FIG. 6 is an exploded perspective view of a part aligning unit applied to the part transporting pallet according to the exemplary embodiment of the present invention.
Figure 7:
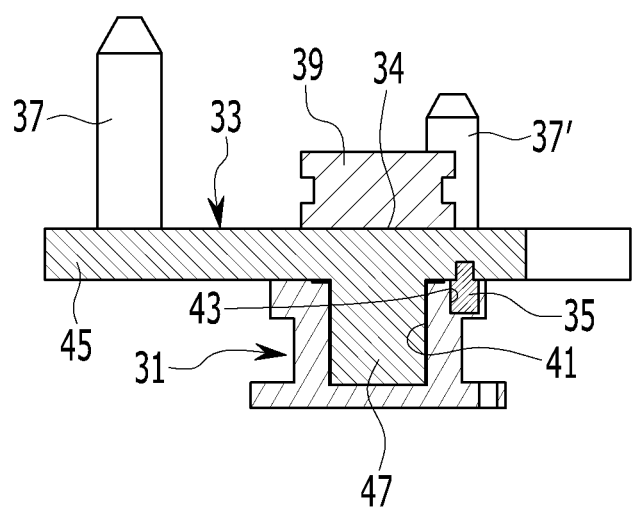
FIG. 7 is a combined cross-section schematic diagram that illustrates the part aligning unit applied to the part transporting pallet according to the exemplary embodiment of the present invention.

FIG. 6 is an exploded perspective view of the part aligning unit applied to the part transporting pallet according to the exemplary embodiment of the present invention, and FIG. 7 is a combined cross-section schematic diagram that illustrates the part aligning unit applied to the part transporting pallet according to the exemplary embodiment of the present invention.

Referring to FIG. 6 and FIG. 7, together with the above-disclosed drawings, the part aligning unit 30 according to the exemplary embodiment of the present invention includes a holder 31, a locator 33, a position determining pin 35, a position aligning pin 37, and a knob 39.

The holder 31 is formed in a form of a circular block, and is coupled to the edge portion of the upper surface of the base plate 11. The holder 31 is engaged to the base plate 11 through main mount holes 32 formed in the corner of the upper surface of the base plate 11.

In the holder 31, a support groove 41 is formed at a center, and a plurality of position determining grooves 43 are formed at the edge portion of the support groove 41. For example, three position determining grooves 43 may be formed on the holder 31, and the position determining grooves 43 may be disposed on the holder 31 at intervals of 120 degrees.

The locator 33 supports the edge portion of part 1 and is rotatably installed in holder 31. Branching portions 45 branched in a plurality of directions are formed in the locator 33. For example, the locator 33 may include branching portions 45 branched in three directions corresponding to the position determining grooves 43 of the holder 31.

The locator 33 is rotatably coupled to the support groove 41 of the holder 31 through a support rod 47. The support rod 47 is integrally provided on the lower surface of the locator 33. The support rod 47 is vertically connected to a connection point 34 of the branching portions 45 on the lower surface of the locator 33, and is vertically coupled to the support groove 41 of the holder 31

The position determining pin 35 determines the rotation position of the locator 33 through the support rod 47, and is for fixing the locator 33 to the holder 31. The position determining pin 35 is singular and is vertically connected (fixed) to the lower surface of the locator 33. The position determining pin 35 is vertically coupled to the position determining groove 43 of the holder 31.

The position aligning pin 37 is to correctly position the part 1 of different types on the pallet body 10, and is provided in the locator 33. At least two or more of the position aligning pins 37 are provided in the locator 33. The position of the position aligning pins 37 may be changed according to the type of the part 1 by a rotation of the locator 33.

The position aligning pin 37 is coupled to the pin hole 2 provided in the edge portion of part 1. The position aligning pin 37 is formed in the vertical direction on the upper surface of the remaining two branching portions 45 excluding one of the three branching portions 45 of the locator 33.

The knob 39 is a part that holds the locator 33 to change the position of the position aligning pin 37, and may be held by a worker or a robot. The knob 39 is fixed to the connection point 34 of the branching portions 45 on the upper side of the locator 33.

The above-described part aligning units 30 are mounted on the main mount hole 32 in the base plate 11 of the pallet body 10, and depending on the type of the part 1, the part aligning unit 30 may be mounted on a spare mount hole 36 in a position close to the main mount hole 32.

Referring to FIG. 1 to FIG. 3, in the exemplary embodiment of the present invention, the part support pads 60 are provided to support the bottom side of the part 1 aligned in the part aligning units 30.

The part support pads 60 are provided on the base plate 11 of the pallet body 10. The part support pads 60 support the lower surface of part 1 in a state where the position aligning pin 37 of the part aligning units 30 is inserted into the pin hole 2 formed on the edge portion of the part 1.

The part support pads 60 are disposed on an internal area of the area where the part aligning units 30 are disposed on the upper surface of the base plate 11. The part support pads 60 are fixed on the upper surface of the base plate 11 to be spaced from it. Furthermore, the part support pads 60 may be provided as circular pads of a rubber material.

Hereinafter, operation of the part transporting pallet 100 according to the exemplary embodiment of the present invention formed as described above will be described in detail with reference to the drawings included above.

First, in the exemplary embodiment of the present invention, the AMR 6 is disposed in a predetermined area of a process work field, and the lifter 7 of the AMR 6 is in a state of being moved in the downward direction thereof.

Furthermore, the part transporting pallet 100 according to the exemplary embodiment of the present invention is disposed in the predetermined area. In the predetermined area, a part loading device (not shown in the drawing) grips the part 1 as an electric vehicle battery 3, and loads the part 1 on the upper surface of the pallet body 10.

On the other hand, the locator 33 of the part aligning units 30 is in a rotated state with respect to the holder 31 according to the type of the part 1. That is, the positions of the position aligning pins 37 provided in the locator 33 are in a variable state according to the type of the part 1.

In a process of changing the position of the position aligning pins 37 in the part aligning units 30, the worker grabs the knob 39 and lifts the locator 33. Accordingly, the locator 33 is lifted while being inserted into the support groove 41 of the holder 31 through the support rod 47. Furthermore, the position determining pin 35 provided in the locator 33 is separated from the position determining groove 43 of the holder 31.

After that, the worker rotates the locator 33, changes the position of the position aligning pins 37 to match the type of the part 1, and inserts the locator 33 into the support groove 41 of the holder 31 through the support rod 47.

Accordingly, the position determining pin 35 is inserted into the position determining groove 43 in another position.

Accordingly, the position determining pin 35 determines the rotation position of the locator 33, and fixes the locator 33 to the holder 31.

Therefore, in the exemplary embodiment of the present invention, the position of the position aligning pin 37 may be varied according to the type of the part 1 through the process as described above.

Here, the positions of the position aligning pins 37 in a pair of part aligning units 30 disposed in any one diagonal direction may be varied according to the part 1 of two types.

Furthermore, the positions of the position aligning pins 37 in a pair of part aligning units 30 disposed in the other diagonal direction may be varied according to other two types of the part 1 through the above process.

Through such a process, in the exemplary embodiment of the present invention, it is possible to vary the position of the position aligning pins 37 according to four types of the part 1. This is possible because the position aligning pin 37 is provided in two branching portions 45 of the branching portions 45 branched in three directions in the locator 33, respectively.

FIG. 8, FIG. 9, FIG. 10 and FIG. 11 are provided to describe the operation of the part transporting pallet according to the exemplary embodiment of the present invention.

In FIG. 8, FIG. 9, FIG. 10 and FIG. 11, it will be exemplarily illustrated that four position aligning units 30 are provided in the pallet body 10 of the part transporting pallet, and four position aligning units 30-1, 30-2, 30-3, and 30-4 are disposed at corners of the pallet body 10.

Figure 8:
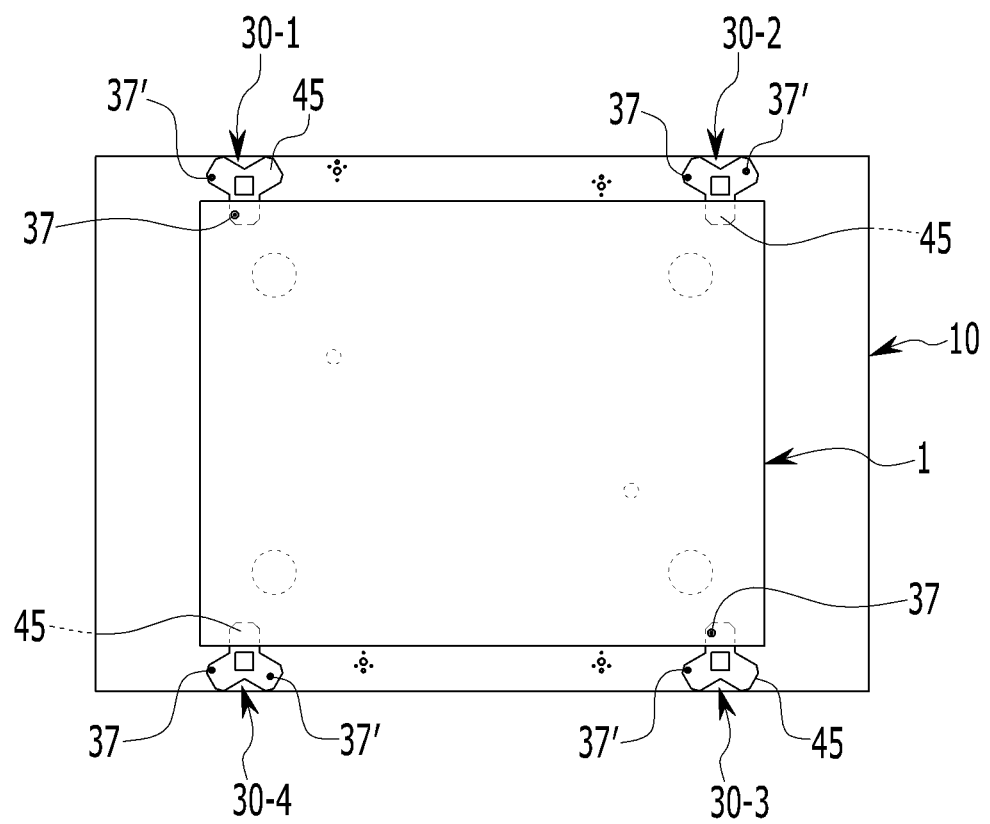
FIG. 8, FIG. 9, FIG. 10 and FIG. 11 are provided to describe the operation of the part transporting pallet according to the exemplary embodiment of the present invention.
Figure 9:
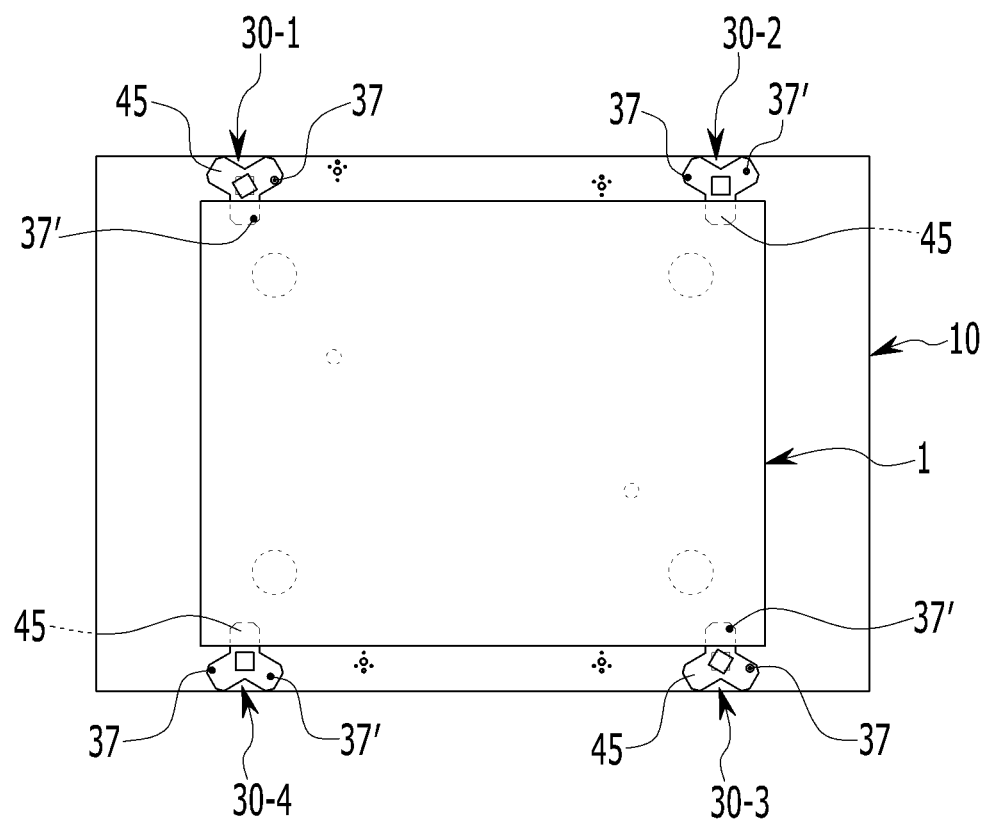
Figure 10:
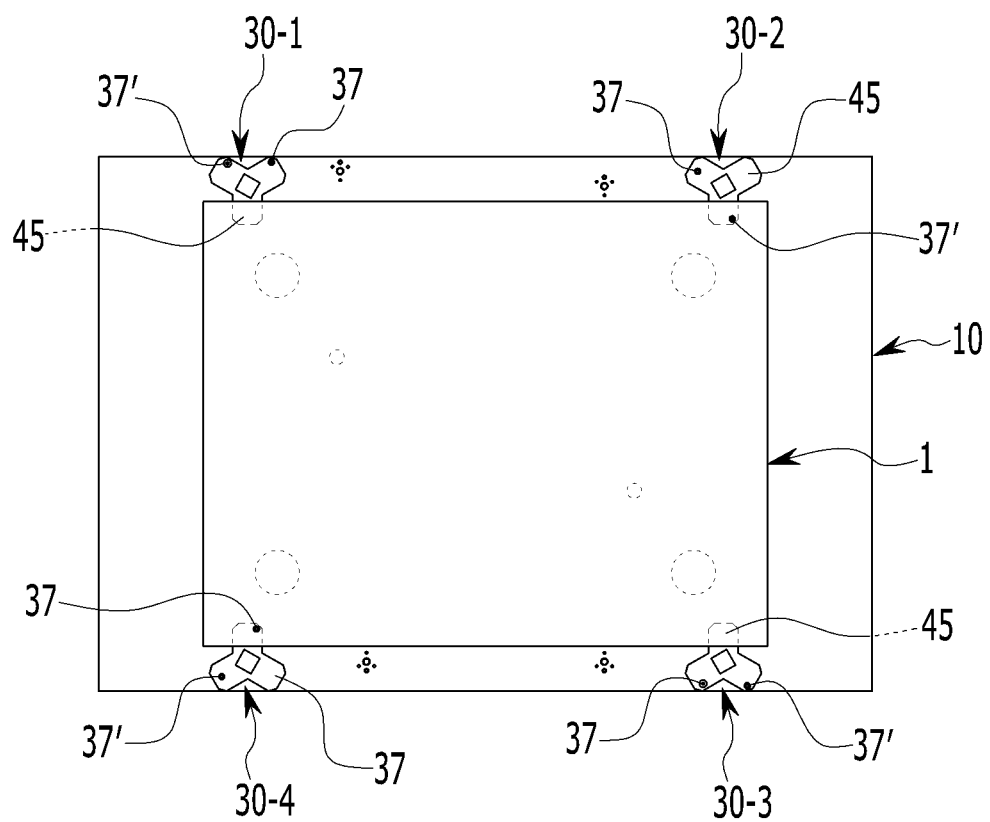
Figure 11:
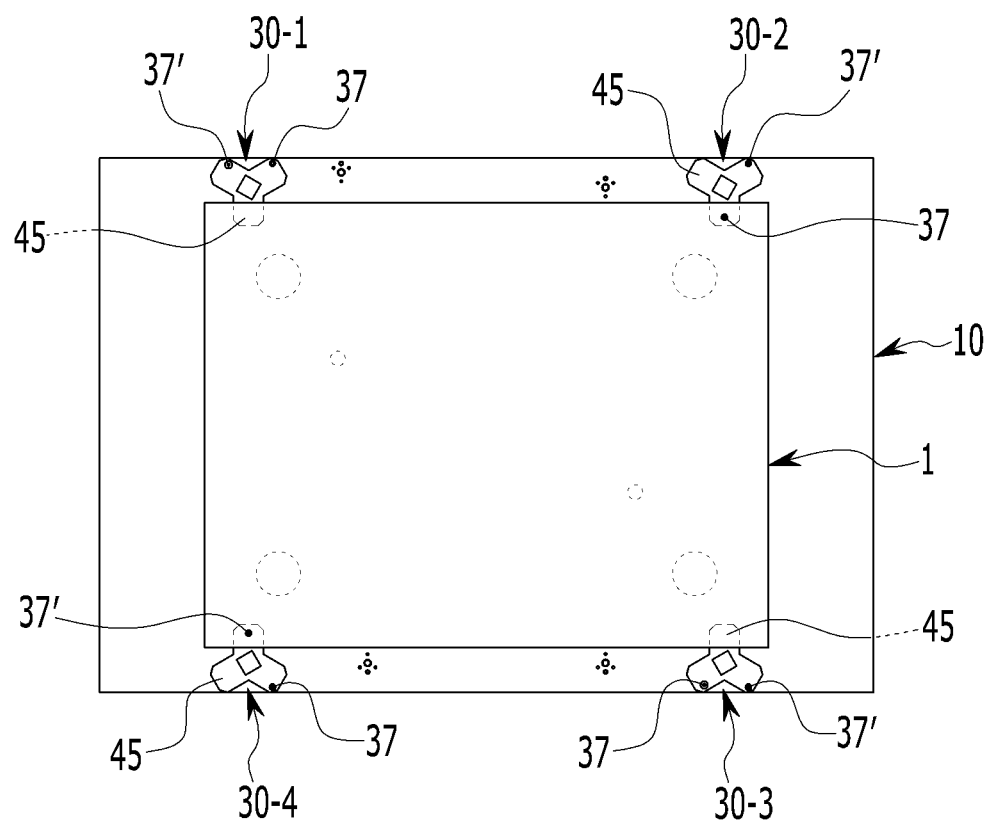

FIG. 8 illustrates a state in which a first type of part is mounted on the part transporting pallet, FIG. 9 illustrates a state in which a second type of part is mounted on the part transporting pallet, FIG. 10 illustrates a state in which a third type of part is mounted on the part transporting pallet, and FIG. 11 illustrates a state in which a fourth type of part is mounted on the part transporting pallet.

Referring to FIG. 8, when the first type of part 1 is mounted on the part transporting pallet, the part aligning unit 30 rotates such that position aligning pins 37 of a pair of part aligning units 30-1 and 30-3 disposed in the diagonal direction of any one of the four part aligning units face toward the first type of part 1.

Furthermore, in a pair of part aligning units 30-2 and 30-4 disposed in the other diagonal direction, the part aligning unit 30 rotates such that the branching portions 45 on which the position aligning pins 37 and 37' are not formed face the first type of part 1.

As described, position aligning pins 37 of a pair of part aligning units 30-1 and 30-3 disposed in any one diagonal direction are rotated to face the first type of part 1, and the branching portions 45 in which the position aligning pins 37 and 37' of a pair of part aligning units 30-2 and 30-4 disposed in the other diagonal direction are not formed are rotated to face the first type of part 1 such that the first type of part 1 may be mounted on the part transporting pallet.

Referring to FIG. 9, when the second type of part 1 is mounted on the part transporting pallet, the position aligning pins 37' of a pair of part aligning units 30-1 and 30-3 disposed in the diagonal direction of any one of the four part aligning units 30 face the second type of part 1 by a rotation of the part aligning unit 30.

Furthermore, in a pair of part aligning units 30-2 and 30-4 disposed in the other diagonal direction, the part aligning units 30 are rotated such that the branching portions 45 where the position aligning pins 37 and 37' are not formed in a pair of part aligning units 30-2 and 30-4 disposed in the other diagonal direction face the second type of part 1.

As described, position aligning pins 37' of a pair of part aligning units 30-1 and 30-3 disposed in any one diagonal direction are rotated to face the second type of part 1, and the branching portions 45 in which the position aligning pins 37 and 37' of a pair of part aligning units 30-2 and 30-4 disposed in the other diagonal direction are not formed are rotated to face the second type of part 1 such that the second type of part 1 can be mounted on the part transporting pallet.

Referring to FIG. 10, when a fourth type of part 1 is mounted on the part transporting pallet, the part aligning unit 30 is rotated such that the branching portions 45 where position aligning pins 37 and 37' of a pair of part aligning units 30-1 and 30-3 disposed in the diagonal direction of any one of the four part aligning units are not formed to face toward the third type of part 1.

Furthermore, in a pair of part aligning units 30-2 and 30-4 disposed in the other diagonal direction, the part aligning unit 30 rotates such that the position aligning pins 37 face the third type of part 1.

As described, the branching portions 45 in which the position aligning pins 37 and 37' of a pair of part aligning units 30-2 and 30-4 disposed in any one diagonal direction are not formed are rotated to face the third type of part 1, and the position aligning pins 37 are rotated to face the third type of part 1 in the pair of part aligning units 30-2 and 30-4 disposed in the other diagonal direction such that the third type of part 1 may be mounted to the part transporting pallet.

Referring to FIG. 11, when a fourth type of part 1 is mounted on the part transporting pallet, the part aligning unit 30 rotates such that the branching portions 45 where the position aligning pins 37 and 37' of a pair of part aligning units 30 disposed in any one diagonal direction among four part aligning units 30-1 and 30-3 face the fourth type of part 1.

Furthermore, in a pair of part aligning units 30-2 and 30-4 disposed in the other diagonal direction, the part aligning unit 30 rotates such that the position aligning pins 37' face the fourth type of part 1.

As described, the branching portions 45 in which the position aligning pins 37 and 37' of the pair of part aligning units 30-1 and 30-3 disposed in any one diagonal direction are not formed are rotated to face the fourth type of part 1, and the position aligning pins 37' are rotated to face the fourth type of part 1 in the pair of part aligning units 30-2 and 30-4 disposed in the other diagonal direction such that the third type of part 1 may be mounted to the part transporting pallet.

On the other hand, another pair of part aligning units 30 according to the exemplary embodiment of the present invention may be mounted in the spare mount hole 36 in the pallet body 10. Accordingly, the positions of the position aligning pins 37 in another pair of part aligning units 30 may be changed to fit parts 1 of another two types through the above process.

As described above, in a state where the positions of the position aligning pins 37 are varied according to the type of the part 1 in any pair of part aligning units 30, the position aligning pin 37 is coupled to a pin hole 2 of a part 1 loaded onto the upper surface of the pallet body 10.

In the instant case, the part 1 is coupled to the position aligning pin 37 through the pin hole 2 while being supported by a branching portion 45 in which the position aligning pin 37 is not provided among the branching portions 45 of the locator 33. In the present process, the part support pads 60 support the lower surface of the part 1.

Furthermore, when the part 1 is coupled to a pair of part aligning units 30, the position aligning pins 37 in the other part aligning units 30 are positioned where no interference with the part 1 occurs.

Therefore, in the exemplary embodiment of the present invention, it is possible to align the part 1 to the predetermined position of the pallet body 10 through the part aligning units 30 and to position it correctly.

In the present way, in the state that the part 1 is correctly positioned on the pallet body 10, the AMR 6 autonomously travels along a predetermined path and moves to the lower side of the pallet body 10. After that, the AMR 6 moves the lifter 7 upward at a predetermined position below the pallet body 10.

Accordingly, the lifter 7 supports the lower surface of the base plate 11 through the lift pads 8, and lifts the pallet body 10 in the upward direction thereof. In the instant case, the lifter 7 is coupled to the coupling hole 17 of the base plate 11 through the lift pins 9 and lifts the pallet body 10 in the upward direction thereof.

Next, the AMR 6 autonomously travels along a predetermined path and transports the pallet bodies 10 to a predetermined destination 4.

As described above, in the state in which the pallet body 10 is transported to the destination 4 through the AMR 6, the AMR 6 moves the lifter 7 in the lower direction and moves the pallet body 10 in the lower direction thereof.

Accordingly, the taper portion 19 of the positioning pin 15 provided in the legs 13 of the pallet body 10 is coupled to the pin coupling groove 23 while being guided to the pin coupling groove 23 by the pin guide groove 25 provided in the positioner 21 at the destination 4. In the instant case, the lower end portions of the legs 13 are stably docked to the docking groove 29 of the positioner 21.

Therefore, in the exemplary embodiment of the present invention, the pallet body 10 may be correctly positioned at a predetermined position at the destination 4 while combining the legs 13 and the positioning pin 15 to the positioner 21.

On the other hand, in the exemplary embodiment of the present invention, the part 1 as the electric vehicle battery 3 is assembled at the destination 4, and in the assembly process, for example, a sealer may be applied to the battery cells of the electric vehicle battery 3.

The part transporting pallet 100 according to the exemplary embodiment of the present invention as described so far aligns or correctly positions the part 1 of a plurality of types in common through the part aligning units 30, and may be transported to a predetermined destination 4 by the AMR 6.

Accordingly, in the exemplary embodiment of the present invention, flexible productivity of multi-type parts 1 may be secured, and the equipment investment cost may be reduced due to manufacturing an exclusive pallet when adding a type of the part 1 and manufacturing equipment that aligns or correctly positions the part 1 of multiple types.

Figure 12:
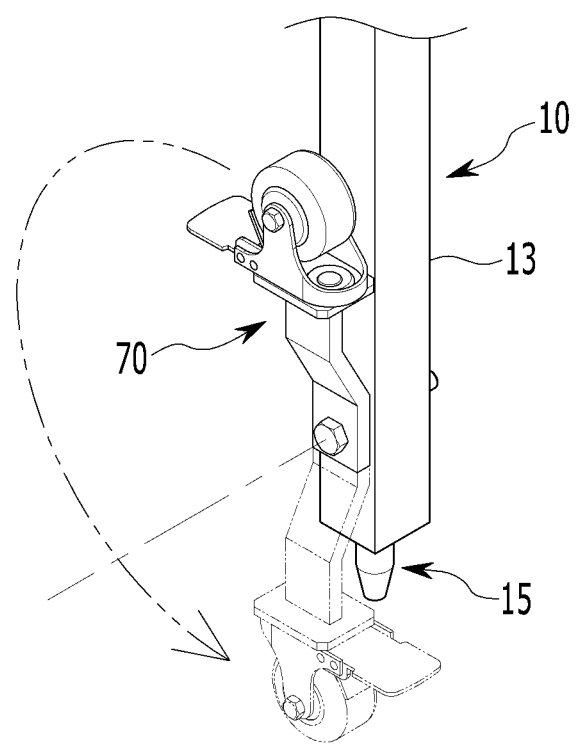
FIG. 12 shows exemplary variation of the pallet body applied to the part transporting pallet according to the exemplary embodiment of the present invention.

FIG. 12 shows exemplary variation of the pallet body applied to the part transporting pallet according to the exemplary embodiment of the present invention.

Referring to FIG. 12, the pallet body 10 according to the exemplary embodiment of the present invention may further include a caster 70 provided in lower end portions of the legs 13.

The caster 70 is a caster wheel of known technology that rotates in the desired direction, and is provided rotatably in the vertical direction on the lower end portions of legs 13.

The caster 70 is configured to be foldable along the vertical direction on the leg 13 separately from the positioning pin 15 provided at the lower end portion of the leg 13. That is, the caster 70 may be tilt-rotated along the vertical direction without interfering with the positioning pin 15.

Therefore, when the caster 70 is tilted and rotated in the downward direction, the pallet body 10 may be manually moved through the caster 70.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A part transporting pallet that transports a part to a predetermined destination in response to operation of a mobile carriage that includes a lifter which is configured for moving upwards and downwards in a vertical direction, the part transporting pallet comprising:
    a pallet body including at least one coupling hole for the lifter to be coupled thereto; and
    a plurality of part aligning units have at least two position aligning pins that correctly position parts of different types on the pallet body, and are provided on the pallet body to vary a position of the at least two position aligning pins according to the types of the parts,
    wherein the pallet body includes:
        a base plate that supports the part;
        a plurality of legs that are provided in the base plate; and
        a positioning pin which is provided at a lower end portion of each leg,
    wherein the positioning pin is coupled to a positioner provided at the predetermined destination in the vertical direction, and
    wherein the legs are configured for being docking-coupled to a docking groove formed in the positioner.

2. The part transporting pallet of claim 1, wherein the at least one coupling hole is for a lift pin provided in the lifter to be coupled thereto.

3. The part transporting pallet of claim 1, further including a plurality of part support pads provided in the pallet body.

4. The part transporting pallet of claim 1, wherein the positioning pin includes a taper portion at a lower end portion of the positioning pin.

5. The part transporting pallet of claim 4, wherein the taper portion is coupled to a pin coupling groove provided in the positioner, and is guided to the pin coupling groove by a pin guide groove formed in the positioner.

6. The part transporting pallet of claim 5, wherein the pin guide groove is in a shape of a taper.

7. The part transporting pallet of claim 1, wherein each part aligning unit includes:
a holder coupled to the pallet body;
a locator that includes branching portions branched in a plurality of directions, and is rotatably coupled to the holder; and
a position determining pin which is fixed to the locator and coupled to the holder.

8. The part transporting pallet of claim 7, wherein each part aligning unit further includes a knob which is provided at a connection point of the branching portions in the locator.

9. The part transporting pallet of claim 7, wherein the at least two position aligning pins are provided in remaining branching portions excluding for a branching portion to which the position determining pin is coupled, among the branching portions.

10. The part transporting pallet of claim 7,
wherein position determining grooves respectively corresponding to the branching portions are formed in the holder, and
wherein the position determining pin is configured to be fitted into one of the position determining grooves.

11. The part transporting pallet of claim 7,
wherein the part aligning units further includes a support rod which is integrally provided in the locator, and
wherein the support rod is rotatably coupled to a support groove formed in the holder.

12. The part transporting pallet of claim 1, wherein the pallet body includes a main mount hole for mounting the part aligning units therein.

13. The part transporting pallet of claim 12, wherein the pallet body further includes a spare mount hole at a location adjacent to the main mount hole for mounting the part aligning units therein.

14. The part transporting pallet of claim 4, wherein the pallet body further includes a caster which is pivotally connected to a lower end portion of each leg.

15. A part transporting pallet that transports a part to a predetermined destination in response to operation of a mobile carriage that includes a lifter which is configured for moving upwards and downwards in a vertical direction, the part transporting pallet comprising:
a pallet body including at least one coupling hole for the lifter to be coupled thereto; and
a plurality of part aligning units have at least two position aligning pins that correctly position parts of different types on the pallet body, and are provided on the pallet body to vary a position of the at least two position aligning pins according to the types of the parts,
wherein the pallet body includes:
a base plate that supports the part;
a plurality of legs that are provided in the base plate; and
a positioning pin which is provided at a lower end portion of each leg,
wherein the positioning pin is coupled to a positioner provided at the predetermined destination in the vertical direction,
wherein the positioning pin includes a taper portion at a lower end portion of the positioning pin, and
wherein the taper portion is coupled to a pin coupling groove provided in the positioner, and is guided to the pin coupling groove by a pin guide groove formed in the positioner.

16. The part transporting pallet of claim 15, wherein the pin guide groove is in a shape of a taper.

17. A part transporting pallet that transports a part to a predetermined destination in response to operation of a mobile carriage that includes a lifter which is configured for moving upwards and downwards in a vertical direction, the part transporting pallet comprising:
a pallet body including at least one coupling hole for the lifter to be coupled thereto; and
a plurality of part aligning units have at least two position aligning pins that correctly position parts of different types on the pallet body, and are provided on the pallet body to vary a position of the at least two position aligning pins according to the types of the parts,
wherein each part aligning unit includes:
a holder coupled to the pallet body;
a locator that includes branching portions branched in a plurality of directions, and is rotatably coupled to the holder; and
a position determining pin which is fixed to the locator and coupled to the holder.

18. The part transporting pallet of claim 17, wherein each part aligning unit further includes a knob which is provided at a connection point of the branching portions in the locator.

19. The part transporting pallet of claim 17, wherein the at least two position aligning pins are provided in remaining branching portions excluding for a branching portion to which the position determining pin is coupled, among the branching portions.

20. The part transporting pallet of claim 17,
wherein position determining grooves respectively corresponding to the branching portions are formed in the holder, and
wherein the position determining pin is configured to be fitted into one of the position determining grooves.

21. The part transporting pallet of claim 17,
wherein the part aligning units further includes a support rod which is integrally provided in the locator, and
wherein the support rod is rotatably coupled to a support groove formed in the holder.

* * * * *